United States Patent
Deboard et al.

(10) Patent No.: US 9,764,544 B1
(45) Date of Patent: Sep. 19, 2017

(54) PRINTER AND PRINTING METHOD FOR THREE DIMENSIONAL OBJECTS

(71) Applicant: Funai Electric Co., Ltd., Osaka (JP)

(72) Inventors: Bruce A Deboard, Lexington, KY (US); Lucas D Barkley, Lexington, KY (US); Michael A Marra, III, Lexington, KY (US)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 15/225,982

(22) Filed: Aug. 2, 2016

(51) Int. Cl.
*B41J 2/015* (2006.01)
*B29C 67/00* (2017.01)

(52) U.S. Cl.
CPC .......... *B41J 2/015* (2013.01); *B29C 67/0074* (2013.01)

(58) Field of Classification Search
CPC .. B41J 2/015; B29C 67/0074; B29C 67/0059; B29C 67/0088
See application file for complete search history.

(56) References Cited

U.S. PATENT DOCUMENTS

| | | | |
|---|---|---|---|
| 5,209,878 A | 5/1993 | Smalley | |
| 5,902,538 A | 5/1999 | Kruger | |
| 2007/0035604 A1* | 2/2007 | Jang | B41J 11/002 347/102 |
| 2015/0273763 A1 | 10/2015 | Okamoto | |
| 2015/0306824 A1* | 10/2015 | Flores Mangas | B29C 67/0088 700/98 |
| 2016/0001504 A1 | 1/2016 | Ikeda | |
| 2016/0325502 A1* | 11/2016 | Lu | B29C 67/0088 |

* cited by examiner

*Primary Examiner* — Jason Uhlenhake
(74) *Attorney, Agent, or Firm* — Luedeka Neely Group, P.C.; Rick Barnes

(57) ABSTRACT

A printer that includes a motor assembly for moving a print head relative to a medium, and a processor for receiving a data structure for a pixel to be printed on the medium. The data structure includes perception data and classification data for the pixel. The processor adjusts at least one printing parameter of the printer based upon the classification data.

18 Claims, 1 Drawing Sheet

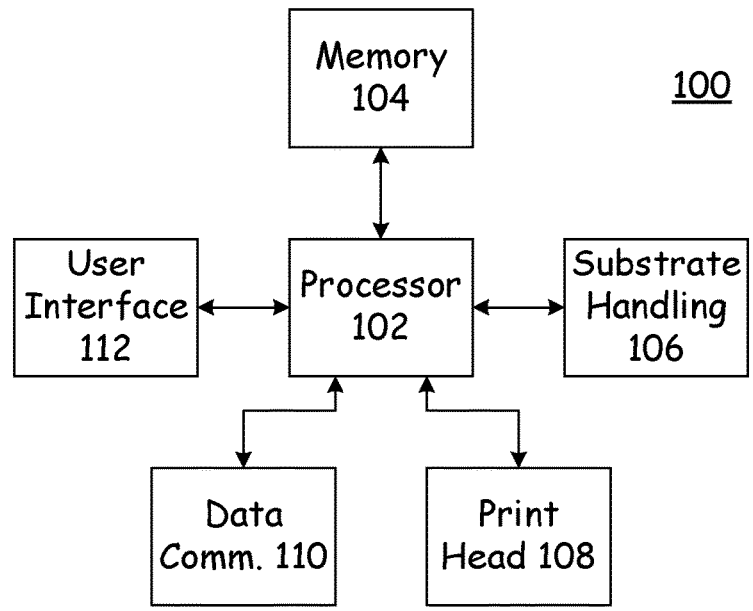
Fig. 1
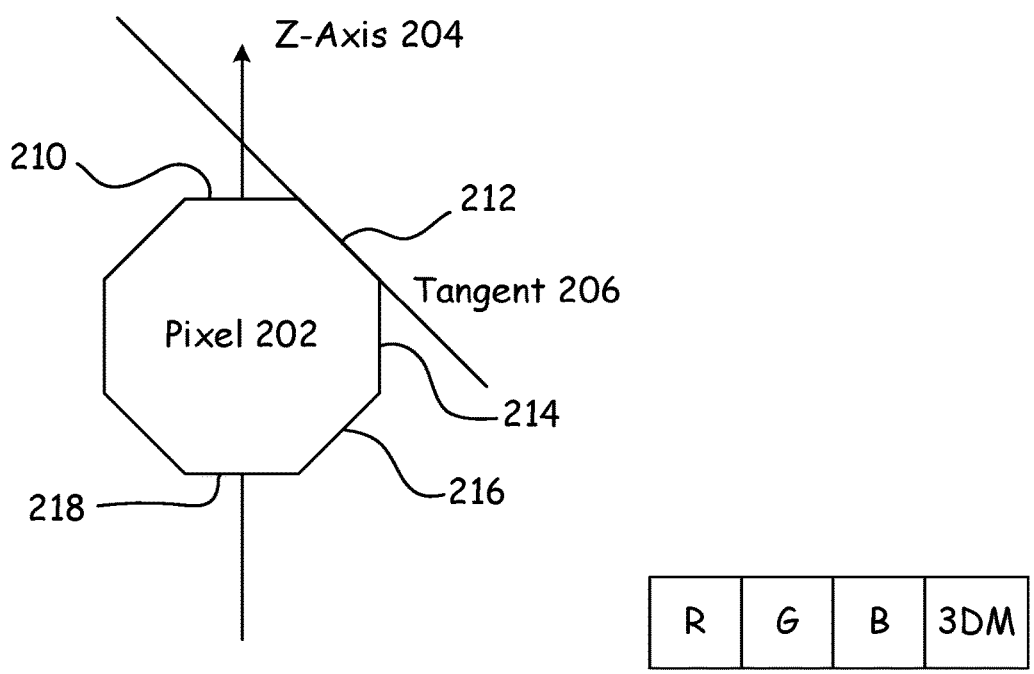
Fig. 2
Fig. 3

PRINTER AND PRINTING METHOD FOR THREE DIMENSIONAL OBJECTS

FIELD

This invention relates to the field of ink jet printing. More particularly, this invention relates to ink jet printing of three-dimensional objects that are constructed of laminated layers of two-dimensionally printed media, such as sheets of paper.

INTRODUCTION

Currently, three-dimensional (3D) printing is generally recognized as a process whereby a machine deposits a material such as a thermoset plastic in layers, and gradually builds up a three dimensional object. The 3D printing described herein is not that kind of printing.

As the term is used herein, 3D printing refers to a process wherein a series of separate media, such as sheets of paper, are printed using an ink jet printer. The media are trimmed and laminated together to form a 3D model. These steps can be performed in a variety of sequences. For example, a given layer can be trimmed and laminated immediately after printing, or it can be laminated and then trimmed immediately after printing. Alternately, all of the layers can be printed, and then trimmed and laminated, or then laminated and trimmed. Other orders of these steps are also known.

The ink jet printers used for such 3D printing can be standard ink jet printers. However, in many 3D printing applications, the printers are modified to suit the peculiarities of this kind of printing. For example, some 3D printers are modified to print on both sides of the medium. Other modifications are also known.

When printing 3D objects in this manner, some of the printed pixels will only be visible from the side. For these pixels, the medium on which they are printed will be cut through the pixel itself, and laminated such that the cut forms a vertical wall with the media above and below it. In this case, neither the top nor the bottom of the medium or the printed pixel is visible. Instead, the cut edge of the medium is visible, and any of the ink that shows through at the cut edge will be visible.

Other pixels of the model will be completely visible from either the top or bottom of the medium on which they are printed, if they are on a horizontal surface of the 3D printed object. Finally, other pixels will be at an edge of the medium that is laminated so as to form a surface with an angle that is between vertical and horizontal, and thus be partially visible from the side and partially visible from at least one of the surfaces of the medium on which they are printed.

Unfortunately, all of the pixels are printed in exactly the same way, even though they will eventually end up being visible in a variety of different ways, as explained above.

What is needed, therefore, is a system the reduces issues such as those described above, at least in part.

SUMMARY

The above and other needs are met by a method of printing a pixel on a medium with a printer, by encoding a data structure for the pixel with perception data and classification data. The classification data describes a visible portion of the pixel in a 3D object formed from the medium. The data structure is transmitted to the printer, and at least one printing parameter of the printer is adjusted based upon the classification data.

By use of the novel classification data, that is appended to the other traditional pixel data in the data structure, the printer is informed of how a given pixel will eventually be viewed in the completed 3D object, and can adjust the printing parameters for that pixel accordingly. Thus, for example, pixels printed on what will be a vertical wall of the 3D structure can be printed with one set of printing parameters, and pixels printed on what will be a horizontal surface of the 3D structure can be printed with another set of printing parameters.

In various embodiments, the data structure includes position data including a designation of a location for printing the pixel on the medium. In some embodiments, the perception data includes at least one of color blend data and opacity data. In some embodiments, the perception data includes red, green, and blue value components. In some embodiments, the classification data includes a designation of an angle at which the printed pixel will be viewed after the medium is trimmed and assembled into a 3D object. In some embodiments, the classification data includes an angle of a tangent to the printed pixel with respect to a Z axis of a plane of the medium. In some embodiments, the classification data includes a designation of a viewing angle of the printed pixel, where the designation comprises one of top surface, top side, side, bottom side, and bottom surface. In some embodiments, the printer is an ink jet printer.

In some embodiments, the at least one printing parameter includes at least one of surface of the medium on which to print the pixel, amount of ink to use when printing the pixel, number of times the pixel is printed, color table used by the printer to print the pixel, speed at which the printer prints the pixel, secondary liquid applied to the medium in a location of the pixel, temperature of an ejector used by the printer to print the pixel, and resolution at which the 3D printer prints the pixel.

According to another aspect of the inventions, there is described a data structure for pixels to be printed on media using a printer. The data structure includes perception data and classification data. The classification data describes a visible portion of the pixel in a 3D object formed from the media.

In various embodiments according to this aspect of the invention, the data structure includes position data comprising a designation of a location for printing the pixel on the medium. In some embodiments, the classification data includes a designation of an angle at which the printed pixel will be viewed after the medium is trimmed and assembled into a 3D object. In some embodiments, the classification data includes an angle of a tangent to the printed pixel with respect to a Z axis of a plane of the medium. In some embodiments, the classification data includes a designation of a viewing angle of the printed pixel, where the designation comprises one of top surface, top side, side, bottom side, and bottom surface.

According to yet another aspect of the present invention, there is described a printer that includes a motor assembly for moving a print head relative to a medium, and a processor for receiving a data structure for a pixel to be printed on the medium. The data structure includes perception data and classification data for the pixel. The processor adjusts at least one printing parameter of the printer based upon the classification data.

In various embodiments according to this aspect of the invention, the perception data comprises red, green, and blue value components. In some embodiments, the classification data includes a designation of an angle at which the printed pixel will be viewed after the medium is trimmed and assembled into a 3D object. In some embodiments, the classification data includes a designation of a predominant viewing angle of the printed pixel, where the designation includes one of top surface, top side, side, bottom side, and bottom surface. In some embodiments, the printer is an ink jet printer. In some embodiments, the at least one printing parameter includes at least one of the surface of the medium on which to print the pixel, amount of ink to use when printing the pixel, number of times the pixel is printed, color table used by the printer to print the pixel, speed at which the printer prints the pixel, secondary liquid applied to the medium in a location of the pixel, temperature of an ejector used by the printer to print the pixel, and resolution at which the printer prints the pixel.

DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 1 is a functional block diagram of a 3D printer according to an embodiment of the present invention.

FIG. 2 is a representation of a pixel and classification data in regard to the pixel according to an embodiment of the present invention.

FIG. 3 is a representation of a data packet, including both perception data and classification data according to an embodiment of the present invention.

DESCRIPTION

With reference now to FIG. 1, there is depicted a functional block diagram of a 3D printer 100 according to an embodiment of the present invention. The 3D printer 100 includes a processor 102 for controlling the various other elements of the 3D printer 100, including a user interface 112, through which user commands and responses can be provided; a data communication port 110, through which print data can be received, such as a USB port, Ethernet port, parallel port, serial port, combination of the same, and so forth; medium handling elements 106, such as motors, pulleys, belts, rollers, combinations of the same, and so forth for moving at least one of the print head 108 and the medium relative to the other; a print head 108 for putting ink onto the medium to form the desired image on the medium, such as a piece of paper, plastic, wood, cloth, and so forth; and a memory 104 for holding operating instructions for the processor 102, data required or desired for printing an image on the medium as described more completely below, and so forth. In some embodiments the printer 100 is a type of ink jet printer, and in other embodiments the printer 100 is a type of laser printer.

Image data structures according to various embodiments of the present invention comprise both perception data and classification data. Perception data, as the term is used herein, is the data that is traditionally included in a computerized image file, and includes information on pixels that the printer will print, such as how much of each color to put into the pixel, for a color printer, or how much of the black ink or toner the printer will put into the pixel for a black and white printer. In some color schemes this is RGB or CMYK data, as given in the example of FIG. 3. For example, a given number of bits might be used to indicate the density level of each of the red, green, and blue hues that are used to give the printed pixel the desired perception. The various embodiments of the present invention as contemplated herein are not limited to any particular configuration of perception data, but are applicable to all such as understood in the art of printing.

It is noted that in some embodiments, some type of position data is also included in the data structures of the image file according to the present invention, where the position data describes the location on the medium to print the given pixel. In some embodiments the position data is actually encoded into the data packet for each pixel. In other embodiments the position data is relative, and is calculated or otherwise understood by the printer merely upon the relative location of the pixel data within the image file. Other forms of position data are also comprehended herein.

Classification data, which is associated with each pixel to be printed, is novel in the embodiments of the present invention. As used herein, the term classification data describes how the printed pixel will be viewed, as described in regard to FIG. 2, in which the pixel 202 has been printed onto a medium. In FIG. 2, we are looking at a cross section of the medium at a point at which the pixel 202 is printed. Thus, the surface 210 of the pixel 202 represents that portion of the pixel 202 that is visible from the top surface of the medium. Likewise, the surface 218 of the pixel 202 represents that portion of the pixel 202 that is visible from the bottom surface of the medium. The other surfaces 212, 214, and 216 represent portions of the pixel 202 that would be visible if the medium is cut through the pixel 202. If the medium is cut substantially vertically through the pixel 202, then surface 214 represents the portion of the pixel 202 that is visible. If the medium is cut on an angle, then either surface 212 or surface 216 might represent the portion of the pixel 202 that is visible, as appropriate. It is appreciated that in some embodiments either a greater or a lesser portion of the pixel 202 than that as depicted is visible.

In the paragraph above, the description of the surfaces is made with respect to a cut through the pixel 202, and the angle of the cut. However, in some embodiments all of the cuts are vertical and go through the pixel 202 in the same position. However, the medium at the point at which the pixel 202 is printed might be laminated with other media, both above it and below it, such that the predominant appearance of the pixel 202 matches more closely a viewing angle that is perpendicular to one of the surfaces 210, 212, 214, 216, and 218 more than the others. Thus, this concept is comprehended within the language used above in regard to the angle of cuts through a pixel 202.

Further, also comprehended within the concepts described above are those cases in which either the cut through the pixel 202 or the stacking of the medium in which the pixel 202 is printed is not limited to just the five surfaces depicted in FIG. 2, but instead an infinite number of different surface angles (or stacking configurations) are comprehended, as generally indicated by tangent line 206. As contemplated herein, the tangent line 206 can have any angle relative to the Z axis line 204 that extends perpendicularly through the top and bottom surfaces of the medium. The predominant viewing angle would perpendicular to the tangent line 206. The angle of the tangent line 206 can also be described as gradient information. Gradient information can also be expressed in other ways, besides angles, such as binned categories.

Thus, the classification data describes how the pixel 202 will be viewed in the final assembled 3D object that is to be constructed from the medium in which the pixel 202 is printed, and other media. The classification data is received by the printer 100 as a part of the image data, such as through the data communications port 110. In some embodiments the classification data is a part of the image file, such as in 3D meta data that is appended to a standard packet of perception data as depicted in FIG. 3, and in some embodiments the classification data is provided separately from the traditional image file. In some embodiments at least one of the classification data and the perception data are stored at least temporarily in the memory 104.

The processor 102 uses both the perception data and the classification data to control the print head 108 as the pixel 202 is printed. The perception data is used in a traditional fashion to determine, for example, the mixture of the color inks that should be used to print the correct color and density of the pixel 202. The processor 102 also uses the classification data to change certain printing parameters of the printer 100, so as to enhance the appearance of the pixel 202, based upon the viewing angle, represented by tangent line 206, at which the pixel 202 will be viewed.

The embodiments of the present invention as described herein are not particularly limited as to the parameters of the 3D printer 100 that can be adjusted based upon the classification data. However, for example, in some embodiments the pixel 202 might be printed on the bottom surface of the medium, if the classification data indicates that the pixel 202 will be predominantly viewed at surface 218. In another embodiment the pixel 202 might be printed on the top of the medium, if the classification data indicates that the pixel 202 will be predominantly viewed at the surface 210. In another embodiment the pixel 202 might be printed on the top and bottom surface of the medium, if the classification data indicates that the pixel 202 will be predominantly viewed at the surface 214. In yet another embodiment, the pixel 202 might be lightly printed on the top surface and heavily printed on the bottom surface of the medium, if the classification data indicates that the pixel 202 will be predominantly viewed at the surface 216.

In yet other embodiments, the parameter of the 3D printer 100 that is varied is the amount of ink that is expelled for the pixel 202, based upon the classification data for the pixel 202. In other embodiments, the parameter of the 3D printer 100 that is varied is the temperature of the ink that is expelled for the pixel 202, based upon the classification data for the pixel 202. In still other embodiments, the parameter of the 3D printer 100 that is varied is the application of a secondary fluid in the same location as the pixel 202, based upon the classification data for the pixel 202.

In yet other embodiments, the parameter of the 3D printer 100 that is varied is the number of times the pixel 202 is printed, based upon the classification data for the pixel 202. In yet other embodiments, the parameter of the 3D printer 100 that is varied is the color table used by the 3D printer 100 to print the pixel 202, based upon the classification data for the pixel 202. In some embodiments, the parameter of the 3D printer 100 that is varied is the speed at which the 3D printer 100 prints the pixel 202, based upon the classification data for the pixel 202. In some embodiments, the parameter of the 3D printer 100 that is varied is the resolution at which the 3D printer 100 prints the pixel 202, based upon the classification data for the pixel 202.

The example of FIG. 2 could use three bits per pixel of data to encode all the possibilities for the five surfaces (with associated predominant viewing angles) 210, 212, 214, 216, and 218, where distinct print quality problems can exist for each surface.

Surface 210 is the closest to traditional printing, but it is also the area in which the most traditional print quality defects could show up, so it may be advantageous to print this surface with a higher quality print mode. Surface 212 is an area where the pixels have some properties of surface 210, and some properties of surface 214. For this surface, we may want to do methods that are both high quality for the surface pixels, but may also include some methods to improve saturation. Surface 214 is an area in which the pixels will only be visible through the cross-section of the medium, so ink saturation is important here, particular viewed through this cross-section. Surface 216 is an area with properties of both surfaces 214 and 218.

Surface 218 is an area where, if the printer can only print on the top side (surface 210), the color must saturate through the page and be visible on the bottom (surface 218). This is challenging, because at the same time, (and unlike the side class surface 214), the bottom surface 218 is where sharpness matters (like the top surface 210). So methods that can provide a balance between saturating the medium and retaining sharpness would be ideal here. If the printer can print on both sides of the medium through duplex or another method, then this surface 218 becomes the same as the top surface 210.

As introduced above, it is the inclusion of the classification data that enables the processor 102 to change the operational parameters of the 3D printed 100 as necessary, regardless of what those parameters might be, such that the pixel 202 is printed in such a way as to increase the effectiveness of that printed pixel 202 at the anticipated viewing angle, however that effectiveness might be measured.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A two-dimensional printer for printing an ink-based pixel on a substantially two-dimensional non-ink medium, the printer comprising a motor assembly for moving a print head relative to the medium and a processor for receiving a data structure for the pixel to be printed on the medium, where the data structure includes perception data and classification data for the pixel, wherein the classification data comprises a designation of an angle of the medium at which the printed pixel will be viewed after the medium is trimmed and assembled into a 3D object, and the processor decides at least one printing parameter of the printer based upon the classification data.

2. The printer of claim 1, wherein the designation of an angle comprises one of top surface, top side, side, bottom side, and bottom surface of the medium.

3. The printer of claim 1, wherein the printer is an ink jet printer.

4. The printer of claim 1, wherein the at least one printing parameter includes at least one of surface of the medium on which to print the pixel, amount of ink to use when printing the pixel, number of times the pixel is printed, color table used by the printer to print the pixel, speed at which the printer prints the pixel, secondary liquid applied to the medium in a location of the pixel, temperature of an ejector used by the printer to print the pixel, and resolution at which the 3D printer prints the pixel.

5. A data structure for ink-based pixels to be printed on a substantially two-dimensional non-ink medium using a two-dimensional printer, the data structure comprising perception data and classification data, where the classification data describes a visible portion of the pixel in a 3D object formed from the medium after the medium is trimmed and assembled.

6. The data structure of claim 5, wherein the data structure further comprises position data comprising a designation of a location for printing the pixel on the medium.

7. The data structure of claim 5, wherein the classification data comprises a designation of an angle at which the printed pixel will be viewed after the medium is trimmed and assembled into a 3D object.

8. The data structure of claim 5, wherein the classification data comprises an angle of a tangent to the printed pixel with respect to a Z axis of a plane of the medium.

9. The data structure of claim 5, wherein the classification data comprises a designation of a viewing angle of the printed pixel, where the designation comprises one of top surface, top side, side, bottom side, and bottom surface.

10. A method of printing an ink-based pixel on a substantially two-dimensional non-ink medium, the method comprising the steps of:

encoding a data structure for the pixel with perception data and classification data, where the classification data describes a predominant viewing angle of the pixel in a 3D object formed from the medium after the medium is trimmed and assembled, transmitting the data structure to a two-dimensional printer, adjusting at least one printing parameter based upon the classification data.

11. The method of claim 10, wherein the data structure further comprises position data comprising a designation of a location for printing the pixel on the medium.

12. The method of claim 10, wherein the perception data comprises at least one of color blend data and opacity data.

13. The method of claim 10, wherein the perception data comprises red, green, and blue value components.

14. The method of claim 10, wherein the classification data comprises a designation of an angle at which the printed pixel will be viewed after the medium is trimmed and assembled into a 3D object.

15. The method of claim 10, wherein the classification data comprises an angle of a tangent to the printed pixel with respect to a Z axis of a plane of the medium.

16. The method of claim 10, wherein the classification data comprises a designation of a viewing angle of the printed pixel, where the designation comprises one of top surface, top side, side, bottom side, and bottom surface.

17. The method of claim 10, wherein the printer is an ink jet printer.

18. The method of claim 10, wherein the at least one printing parameter includes at least one of surface of the medium on which to print the pixel, amount of ink to use when printing the pixel, number of times the pixel is printed, color table used by the printer to print the pixel, speed at which the printer prints the pixel, secondary liquid applied to the medium in a location of the pixel, temperature of an ejector used by the printer to print the pixel, and resolution at which the printer prints the pixel.

* * * * *